US011325390B2

(12) United States Patent
Nordhus et al.

(10) Patent No.: US 11,325,390 B2
(45) Date of Patent: May 10, 2022

(54) PRINT SURFACE POSITIONING SYSTEM FOR FOOD PRODUCT PRINTER

(71) Applicant: Primera Technology, Inc., Plymouth, MN (US)

(72) Inventors: Brent L. Nordhus, Delano, MN (US); Erick Hagstrom, Wayzata, MN (US)

(73) Assignee: PRIMERA TECHNOLOGY, INC., Plymouth, MN (US)

( * ) Notice: Subject to any disclaimer, the term of this patent is extended or adjusted under 35 U.S.C. 154(b) by 0 days.

(21) Appl. No.: 17/003,324

(22) Filed: Aug. 26, 2020

(65) Prior Publication Data

US 2021/0060972 A1 Mar. 4, 2021

Related U.S. Application Data

(60) Provisional application No. 62/894,323, filed on Aug. 30, 2019.

(51) Int. Cl.
*B41J 3/407* (2006.01)
*B41J 2/175* (2006.01)
(Continued)

(52) U.S. Cl.
CPC .......... *B41J 2/17563* (2013.01); *A21D 13/24* (2017.01); *A21D 13/80* (2017.01); *A23P 20/18* (2016.08);
(Continued)

(58) Field of Classification Search
CPC .... B41J 25/304; B41J 25/308; B41J 25/3082; B41J 3/407; B41J 3/4078
See application file for complete search history.

(56) References Cited

U.S. PATENT DOCUMENTS 4,981,074 A   1/1991   Machita et al.
5,505,775 A   4/1996   Kitos
(Continued)

FOREIGN PATENT DOCUMENTS

CN        1868754 A    11/2006
CN     201325212 Y    10/2009
(Continued)

OTHER PUBLICATIONS

International Search Report issued for PCT/US2020/048406, dated Nov. 26, 2020.
(Continued)

*Primary Examiner* — Scott A Richmond
(74) *Attorney, Agent, or Firm* — Westman, Champlin & Koehler, P.A.; Z. Peter Sawicki

(57) ABSTRACT

A system and method for positioning a food product with respect to a print head for printing on a surface thereof. The system is incorporated into a printer. The system has a movable support surface for supporting the food product thereon, the support surface being vertically and horizontally moveable with respect to the print head. A sensor is provided for detecting a position of a surface of the food product positioned on the moveable support surface with respect to the print head. The sensor provides a signal to the printer indicative of a position of the surface of the food product and wherein the moveable support surface is adjustable in response thereto. The sensor is a position sensor configured to detect the position of a top surface of the food product.

3 Claims, 7 Drawing Sheets

(51) Int. Cl.

| | | |
|---|---|---|
| *B41J 2/17* | (2006.01) | |
| *A23P 20/18* | (2016.01) | |
| *B41J 29/02* | (2006.01) | |
| *A23P 20/20* | (2016.01) | |
| *B41J 13/00* | (2006.01) | |
| *B41M 5/00* | (2006.01) | |
| *A21D 13/80* | (2017.01) | |
| *A21D 13/24* | (2017.01) | |
| *B41J 29/17* | (2006.01) | |
| *A23P 20/25* | (2016.01) | |

(52) U.S. Cl.
CPC .............. *A23P 20/20* (2016.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(56) References Cited

U.S. PATENT DOCUMENTS

| | | | |
|---|---|---|---|
| 5,795,395 A * | 8/1998 | Ben-Matitayhu | ........ A23G 3/20 118/13 |
| 5,988,787 A | 11/1999 | Watanabe et al. | |
| 2004/0114192 A1 | 6/2004 | Jensen | |
| 2006/0119628 A1 | 6/2006 | Kofman et al. | |
| 2009/0021548 A1 | 1/2009 | Suzuki et al. | |
| 2011/0025735 A1 | 2/2011 | Nohilly et al. | |
| 2012/0141636 A1 | 6/2012 | Ackley, Jr. et al. | |
| 2019/0009575 A1 * | 1/2019 | Mombourquette | .. B41J 11/0095 |

FOREIGN PATENT DOCUMENTS

| | | |
|---|---|---|
| CN | 105346266 A | 2/2016 |
| CN | 207128411 U | 3/2018 |
| JP | 5346728 A | 12/1993 |
| JP | 2005327918 A | 11/2005 |
| JP | 2007136729 A | 6/2007 |
| JP | 2013078894 A | 5/2013 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |

OTHER PUBLICATIONS

Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.

* cited by examiner

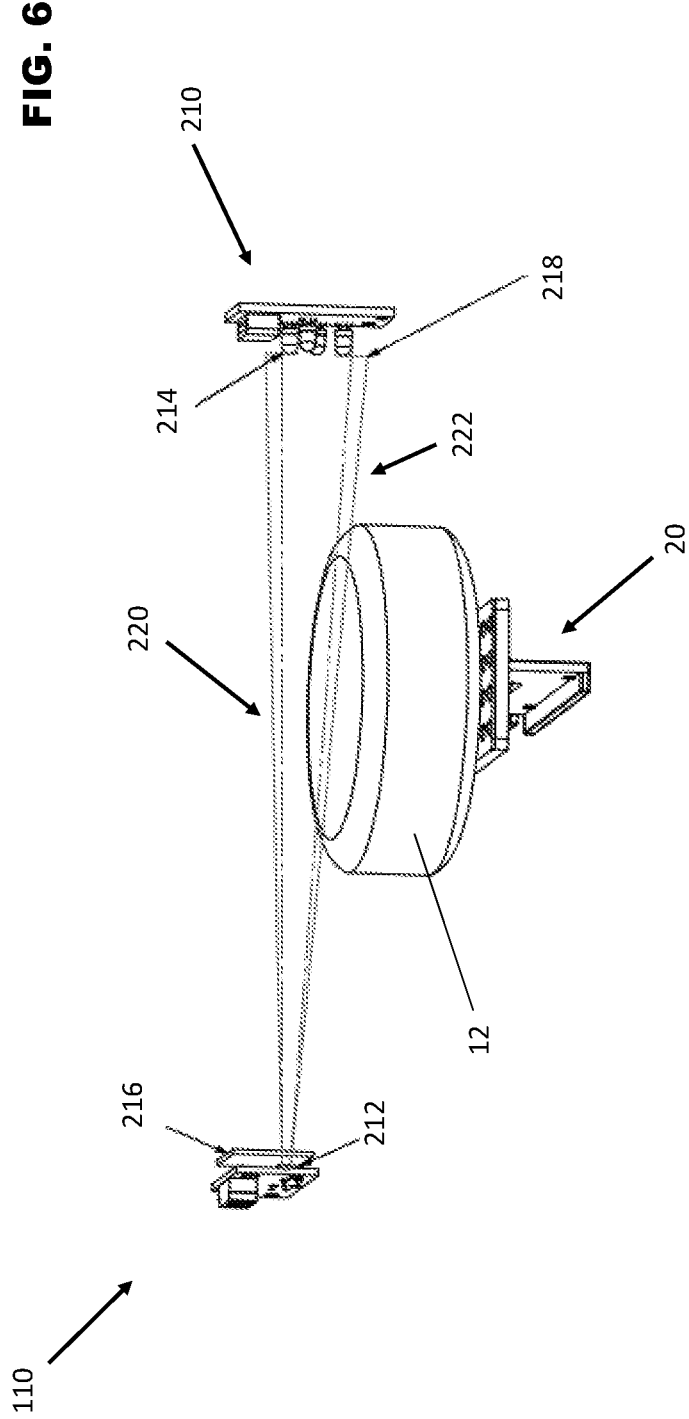

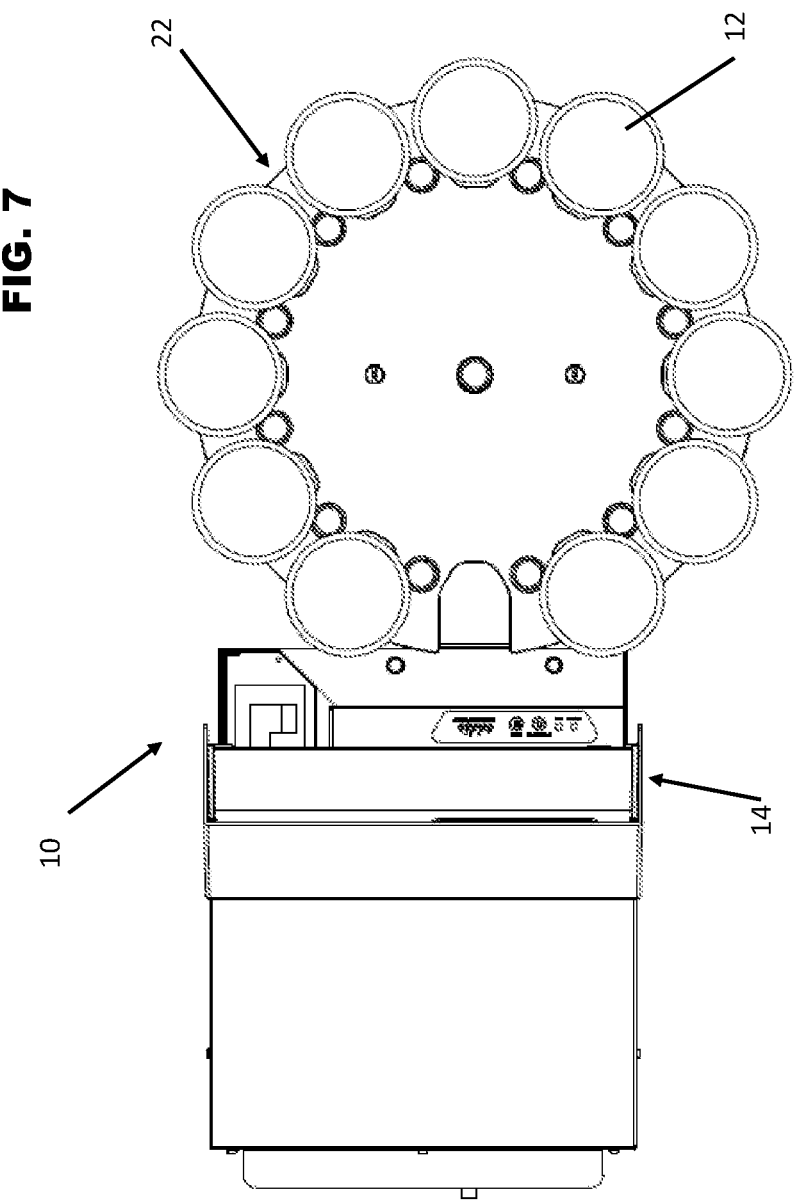

PRINT SURFACE POSITIONING SYSTEM FOR FOOD PRODUCT PRINTER

CROSS-REFERENCE TO RELATED APPLICATION

The present application claims priority to and the benefit of U.S. provisional application Ser. No. 62/894,323, filed on Aug. 30, 2019, the contents of which are hereby incorporated in their entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, can be printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

In the prior art systems, the loading and unloading of a food product on a tray or conveyor during printing is generally impractical. The conveyor or tray are often not accessible while products are being printed. It is also difficult to accurately load a food product on a moving conveyor or tray. It is also difficult to load a food product on a moving conveyor or tray without adversely affecting the print quality of the image currently being printed.

SUMMARY

An aspect of the present disclosure relates to a system for positioning a food product with respect to a print head for printing on a surface thereof. The system is incorporated into a printer. The system has a movable support surface for supporting the food product thereon, the support surface being vertically and horizontally moveable with respect to the print head. A sensor is provided for detecting a position of a surface of the food product positioned on the moveable support surface with respect to the print head. The sensor provides a signal to the printer indicative of a position of the surface of the food product and wherein the moveable support surface is adjustable in response thereto.

The sensor is a position sensor configured to detect the position of a top surface of the food product.

The sensor comprises an emitter and a receiver spaced apart within the printer with the print head therebetween.

The emitter provides a beam light across a print area below the print head for detecting a vertical position of the surface of the food product with respect to a nozzle of the print head.

The support surface is selectively and automatically positionable below the print head, the positioning of the support surface based at least in part on a thickness of the food product supported thereon, a selected distance between the print surface and a print nozzle for printing, or combinations thereof.

The printer is an ink jet printer configured for use with edible ink.

The support surface is constructed from a food grade material comprising a metal such as stainless steel, or a plastic material.

The support surface is textured to provide a co-efficient of friction sufficient to securely retain the food product thereon during movement and printing.

The food product is an edible element having a substantially flat surface, a pastry, cookie, frosting sheet, rice paper, or a combination thereof.

Another aspect of the present disclosure is a method of detecting and adjusting a position of a print surface of a food product for printing content thereon. A support surface holding a food product thereon is retracted into a printer for positioning the food product below a print head of the printer and a position of a print surface of the food product below the print head of the printer is detected with a sensor. Content is then printed directly on a surface of the food product.

The detected position of the print surface is compared to a pre-determined position of the print surface for printing and a position of the support surface below the print head is adjusted when the detected position is outside of the pre-determined position.

A vertical position of the support surface is adjusted to match the pre-determined position to adjust the vertical position of the print surface of the food product with respect to the print head.

BRIEF DESCRIPTION OF THE DRAWINGS

FIG. 6 is an exploded view of a sensor system of the printer system.

FIG. 7 is a top view of the food product printing system with food product for printing loaded thereon.

DETAILED DESCRIPTION

Figure 1:
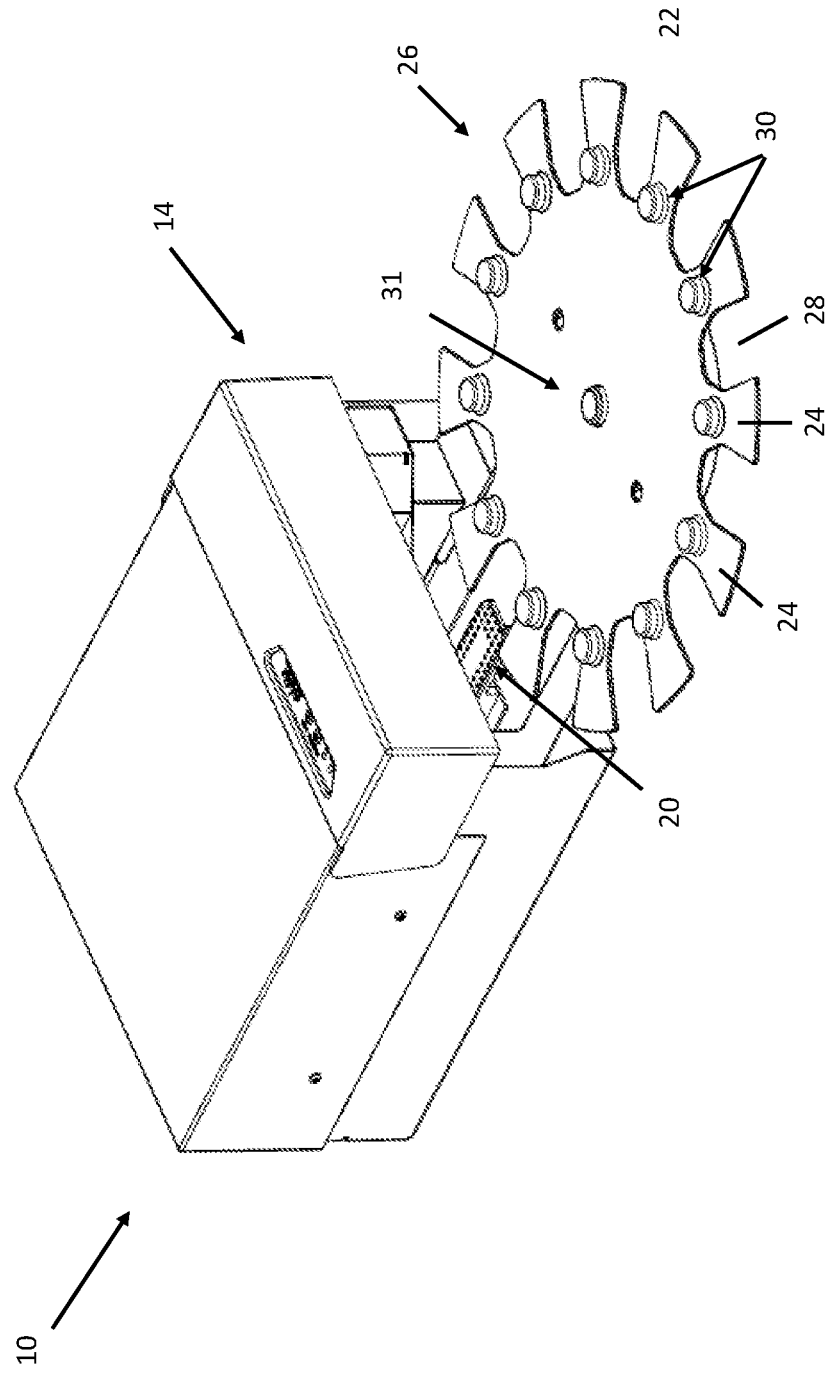
FIG. 1 is a perspective view of a food product printing system.
Figure 2:
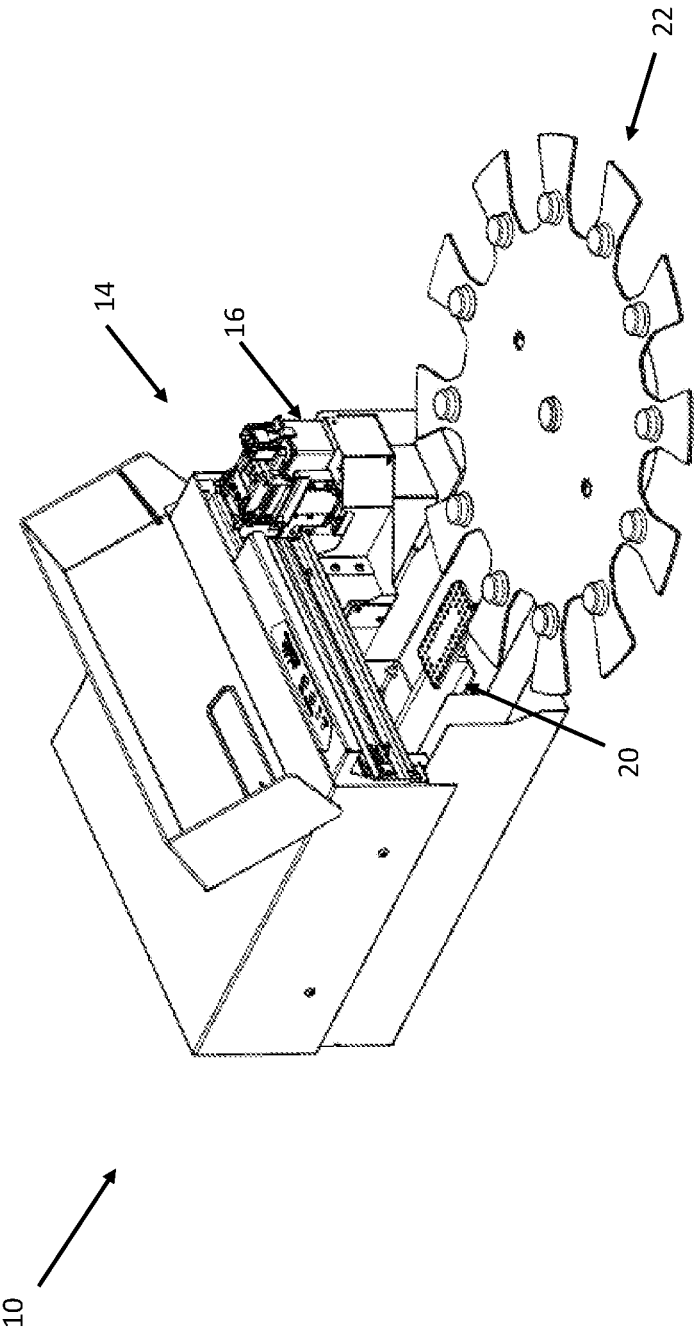
FIG. 2 is a perspective view of a food product printing system with a cover portion opened for exposing interior portions of a printer portion of the system.
Figure 3:
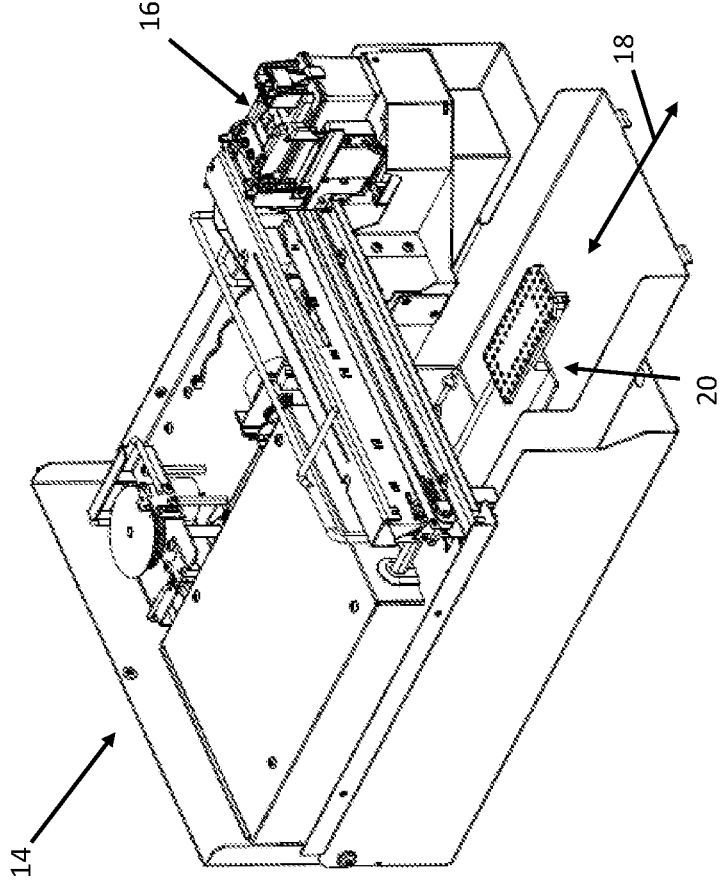
FIG. 3 is a top perspective view of the food product printing system having an automatic delivery tray component removed and a cover of a printer removed.
Figure 4:
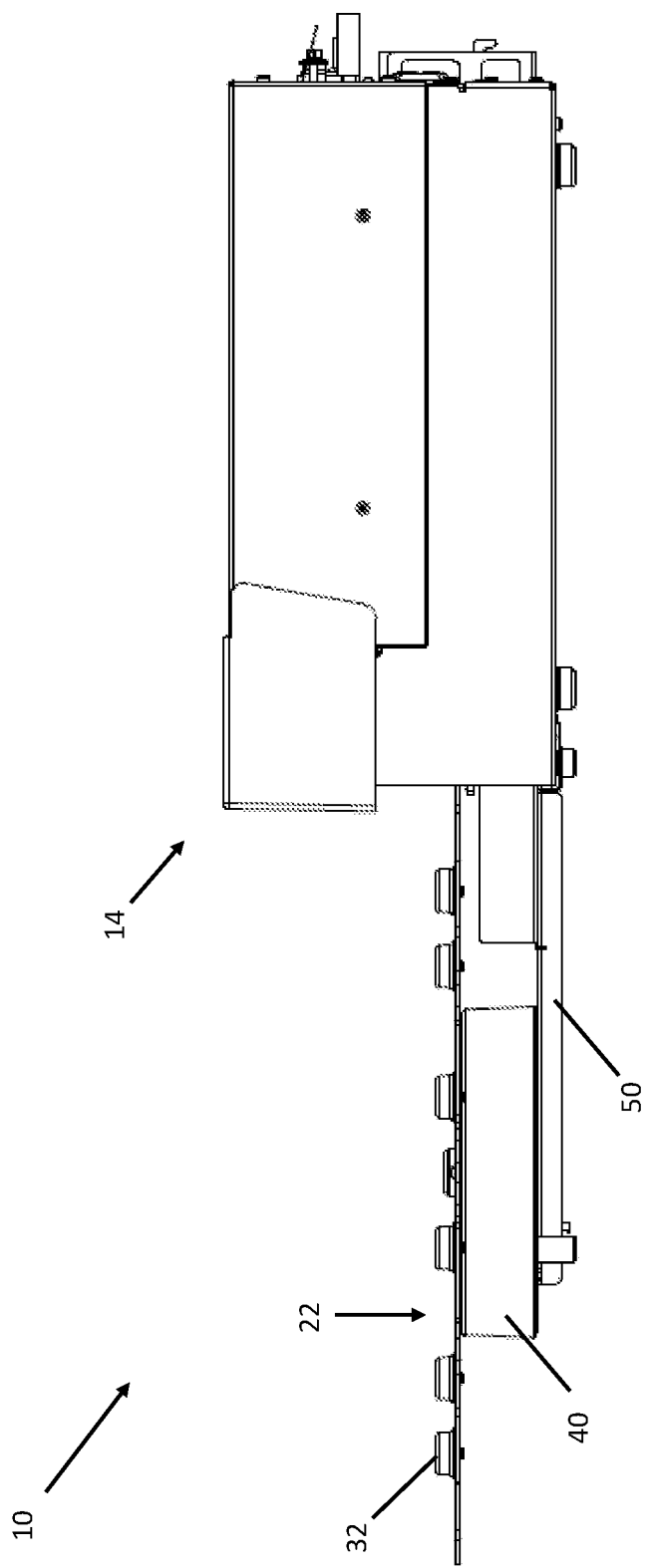
FIG. 4 is a side view of the food product printing system with the automatic delivery tray component removable secured to a tray base portion.

A print surface detecting system described herein can be incorporated into a food product printing system where the printing system includes a printer for printing an image on a surface of the food product. The print surface may be an actual surface of the food product itself. As the position of the print surface may vary between food products during printing, the print surface detecting system detects the position of the print surface within the printer to initiate printing on a selected area of the print surface. The printer surface detecting system comprises a receiving arm and sensor that may be incorporated into a printer system. For example, the printer surface detecting system is provided in a printer system also having a delivery tray for providing food products for printing thereon. The delivery tray is configured for continuous delivery of a varied number of food products, and/or for food products of different or specific dimensions to the receiving arm. The receiving arm then delivers the food product to the printer. The print surface detecting system then detects the position of the print surface of the food product and printing is initiated and adjusted accordingly.

More specifically, the print surface detecting system includes a receiving arm that moves horizontally and vertically to deliver the food product for printing and one or more sensors for detecting a horizontal and vertical position of the print surface with respect to a print head of the printer.

The print surface detecting system allows the food product to be transferred from the delivery tray to the print head or print area of the printer without movement of the delivery tray. This simplifies the delivery of food products from the delivery tray to the receiving arm. The system also allows the receiving arm to be positioned vertically so that an upper surface of the food product or the print surface, is positioned at an ideal distance from the print head and print nozzles, regardless of the thickness or height of the individual food product. The print surface detecting system detects the vertical position of the top surface of the food product so the printer can automatically position each food product at an ideal level for printing. The system also sends a signal to indicate the actual presence of the food product within the print area for printing when the food product is present.

In further detail, the receiving arm is configured for receiving a food product from the delivery tray and moving the food product from the delivery tray into the printer and into a printing position. The printing position is substantially below a print head of the printer such that the surface to be printed on is in the path of the print head. The sensors detect the position of this surface such that the position of the receiving arm can be adjusted to place the print surface in a selected print position. For example, the receiving arm can be raised or lowered to ensure the print surface is a selected distance from the print nozzles. Once the food product is printed, the receiving arm then returns the printed food product to the delivery tray. The delivery tray is also configured to move in one or more directions in order to continuously and automatically deliver a plurality of food items sequentially to the receiving arm. Sequential food products may have varying thicknesses for example and the position of the receiving arm during printing can then be adjusted "on the fly" during printing a plurality of food items to ensure each product is printed with a high quality image or text, regardless of food product thickness or other dimension.

One embodiment of the printing system 10 is illustrated generally in FIGS. 1-7. The printing system 10 is configured to receive a food product 12 from a delivery tray 22, to print on a surface of the food product 12 and return the food product 12 to the delivery tray 22. The system is also configured to do so automatically and continuously for a pre-determined number of food products 12. The system 10 comprises a printer 14 having a print head 16 and nozzles (not shown) wherein the print head 16 and nozzle are configured for printing with edible ink. The print head 16 can be a carriage for an ink cartridge where the ink cartridge may be filled with edible printer ink. The printer 14 also supports an extendable and retractable receiving arm 20 therein.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending therebetween. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller 50 wherein software may be used to control printing of the content on one or a plurality of food products 12.

In further detail, the receiving arm 20 moves in a direction perpendicular to the print head path such that the receiving arm 20 extends and retracts across or through the path of the print head 16. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a co-efficient of friction between the receiving arm 20 and the food product for retaining the food product 12 on the arm 20.

The receiving arm extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. A base 40 for providing power and controlling advancement and vertical positioning of the delivery tray 22 in synchronization with the receiving arm 20 and a sensor system 110. The base 40 is spaced apart from the printer 14 and may be removably connected to the printer 14 via a stabilization arm 50 that extends from a housing of the base 40 to removable connection or coupling to a housing of the printer 14.

The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. The vertical movement of the receiving arm 20 also allows for selective positioning of the receiving arm and thus a vertical position of the food product positioned thereon for printing.

Figure 5B:
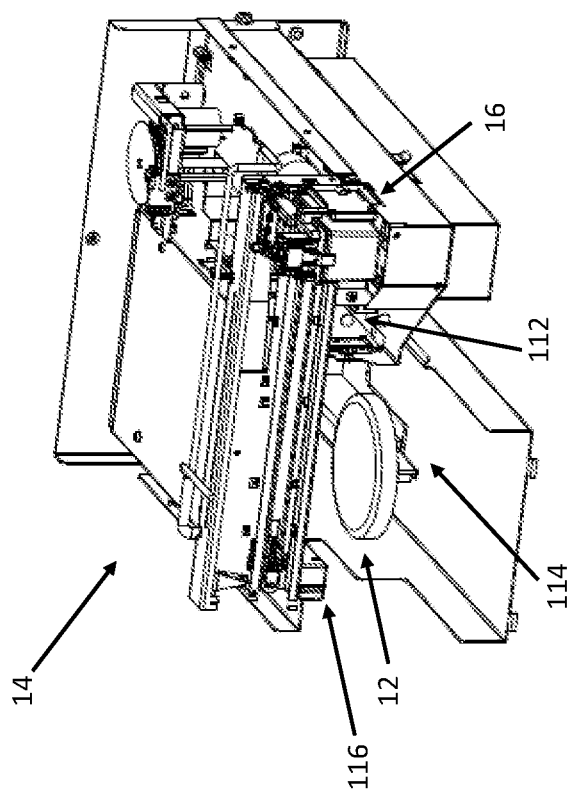
FIG. 5B is an additional side perspective view of the printer system without a housing or cover.
Figure 5A:
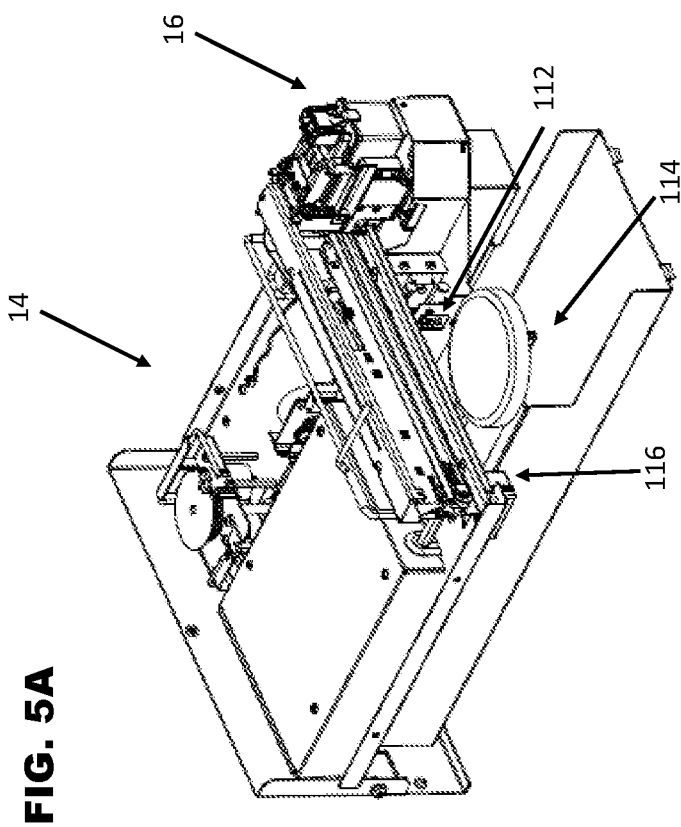
FIG. 5A is a side perspective view of the printer system without a housing or cover.

As illustrated in FIGS. 5A-6, the sensor system 110 is positioned within the printer 10 near the print area and are configured to detect the position of the print surface within the print area for initiating printing when the print surface is at a selected position. The sensors system 110 may comprise a position or proximity sensor of any type. For example, a photoelectric or laser sensor is used. An emitter 112 is positioned within the printer and on a first side of the print area 114 and a receiver 116 is then positioned within the printer 14 on a second, opposing side of the print area 114 such that the sensing area includes the print area 114 and the print positions between the receiving arm 20 and below the print head 16. One or more sensor systems 110 may be incorporated into the printer 14 in order to detect the vertical position of the print surface. The emitter 112 provides a beam of light across the print area 114 and as a food product 12 and print surface are positioned within the beam of light, the receiver 116 records the light transmitted or blocked and sends a signal to the controller indicative of a position of the print surface and indicative of vertical adjustment if needed.

In one or more embodiments, an array of sensors may be used. By way of non-limiting example, FIG. 6 illustrates the sensor system 110 that may comprise an emitter 210 and a receiver or sensor 212 where the emitter 210 comprises a linear, vertical array of LED lights 214 and an LED sensor 212. The emitter 210 may comprise a plate supporting the array of LED lights 214 and a sensing envelope 218. Thus, as illustrated by the arrows 220 and 222 respectively, light is emitted from the array 214 and received by the sensor 212 and a signal is provided by the sensor 212 to the envelope 218. The emitter 210 and sensor 212 are spaced apart and are positionable within the printer system 10 as described previously above. The sensor system 110 is configured to provide an accurate and improved indication as to where a top surface of the food product 12 is located or positioned as the receiving arm 20 is moving the food product 12 with respect to the printer system 10. A filter 216 may also be provided in front of the sensor 212 to filter and thus allow emission of a selected wavelength of light which the system is configured to sense or detect. The filter 216 allows for the reduction of errors in determining position of the print surface by reducing ambient, external light errors due to external light sources interfering with the sensor system.

In the illustrated embodiment the food product 12 is a dessert item such as a cookie. However, while examples of food items include various shapes, sizes, and types of cookies, the food items that can be printed with this system are not so limited. Frosting sheets, rice paper, bakery goods having at least one substantially flat surface for printing an image thereon, and other food items may be printed using this system.

The system is further configured with one or more control boards in communication with a computer or controller for configuring and initiating the printing process. The one or more sensors are in communication with the controller and configured to send signals readable by the computer or controller for adjusting the vertical height of the print surface for example. The system also allows for loading of unprinted food products and unloading of printed food products during printing or otherwise "on the fly." The control board or boards allow for the delivery of a first food product, detecting the position of the print surface with respect to the print head and print nozzles, adjusting the position of the print surface with respect to the print head when the position detected does not match the selected position, and printing of the first food product, as well as return of the first food product to the delivery tray, advancing of the delivery tray to provide a second food product for delivery, delivery of the second food product, detecting of the position of the print surface with respect to the print head, adjusting the vertical position of the print surface with respect to the print head if needed, and printing of the second food product, return of the second food product to the delivery tray and advancing for delivery of one or more subsequent food products for printing and return in the same manner. Thus, the system allows for the automatic delivery, printing on and return of a plurality of food products wherein the products may have varying thicknesses.

Although the present disclosure has been described with reference to preferred embodiments, workers skilled in the art will recognize that changes may be made in form and detail without departing from the spirit and scope of the disclosure.

The invention claimed is:

1. A method of detecting and adjusting a position of a print surface of a food product for printing content thereon, the method comprising:
   retracting a support surface holding a food product thereon into a printer for positioning the food product below a print head of the printer;
   detecting a position of a print surface of the food product below the print head of the printer;
   printing content directly on a surface of the food product; and
   extending the support surface with the food product thereon out of the printer for removal of the printed food product therefrom.

2. The method of claim 1 and further comprising:
   comparing the detected position of the print surface to a pre-determined position of the print surface for printing; and
   adjusting a position of the support surface below the print head when the detecting position is outside of the pre-determined position.

3. The method of claim 1 wherein adjusting a position comprises adjusting a vertical position of the support surface to adjust the vertical position of the print surface of the food product with respect to the print head.

* * * * *